INKING PAD HOLDERS FOR STAMPING MACHINES

Original Filed July 15, 1952 2 Sheets-Sheet 1

INVENTOR:
EDWARD S. GARVEY
BY
Fredk. Sherwood
ATTORNEY.

INKING PAD HOLDERS FOR STAMPING MACHINES

Original Filed July 15, 1952 2 Sheets-Sheet 2

INVENTOR:
EDWARD S. GARVEY
BY
ATTORNEY.

United States Patent Office

Re. 24,029
Reissued June 28, 1955

24,029

INKING PAD HOLDERS FOR STAMPING MACHINES

Edward S. Garvey, Clayton, Mo.

Original No. 2,678,626, dated May 18, 1954, Serial No. 298,902, July 15, 1952. Application for reissue February 23, 1955, Serial No. 490,165

3 Claims. (Cl. 118—264)

Matter enclosed in heavy brackets [ ] appears in the original patent but forms no part of this reissue specification; matter printed in italics indicates the additions made by reissue.

My invention relates to improvements in inking [pads] *pad holders* for stamping machines.

An important object of the invention is to provide a simple, inexpensive and highly efficient inking pad *holder* for stamping machines which can be readily fitted to, and removed from, existing types of machines without alterations to, or interference with, the normal function of such mechanisms.

A further object of the invention is to provide an inking pad *holder* of the character which will overcome certain practical objections to, and defects in, the present types of inking [pads] *pad holders* used in connection with stamping machines.

A further object of the invention resides in an open ended channel shaped holder for absorbent inking pads which are to be moved into and out of position from [either] *the open* end of the holder.

A further object of the invention resides in the provision of a rectangularly shaped absorbent felt inking pad that need not be glued to a retainer to hold the same in operative position in the retainer.

Other objects and advantages of the invention will be apparent during the course of the following description.

The invention will be best understood from a consideration of the following detailed description taken in connection with the accompanying drawings forming a part of this application, and in which like characters of reference are employed to designate like parts throughout the same.

Referring to the drawings.

Figure 1:
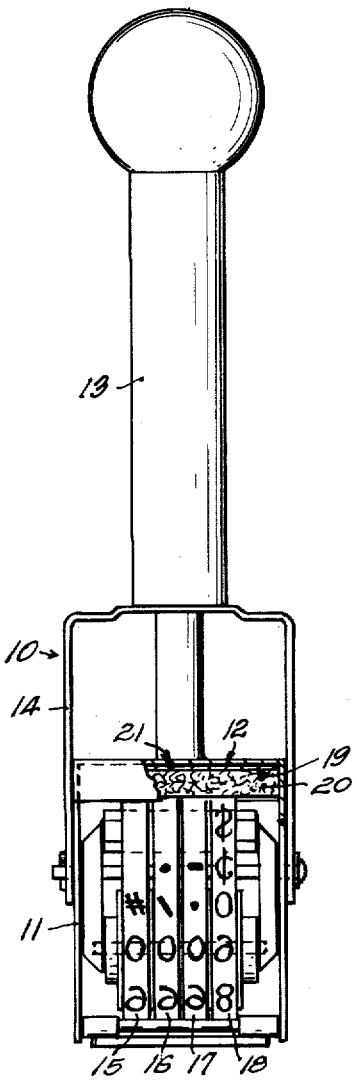
Fig. 1 is a front elevation of one type of stamping machine, and an inking pad holder and pad therefor, which embodies the features of my invention.
Figure 2:
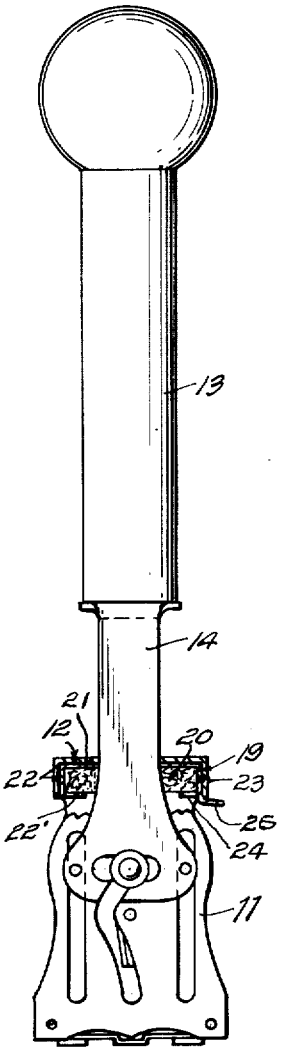
Fig. 2 is a side elevation thereof with parts thereof broken away and showing the inking pad holder and pad partly in sectional elevation.
Figure 3:
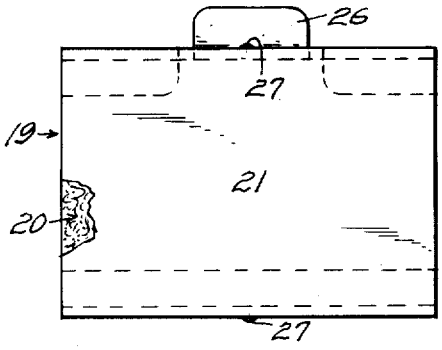
Fig. 3 is a top plan view of inking pad holder.
Figure 4:
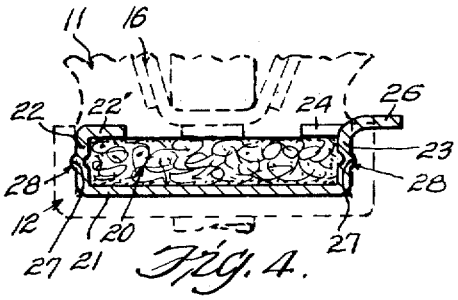
Fig. 4 is a sectional view taken on line 4—4 of Fig. 5.
Figure 5:
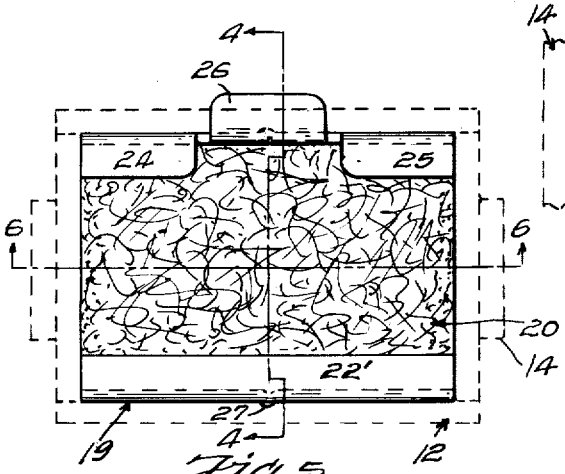
Fig. 5 is a bottom plan view of the holder.
Figure 6:
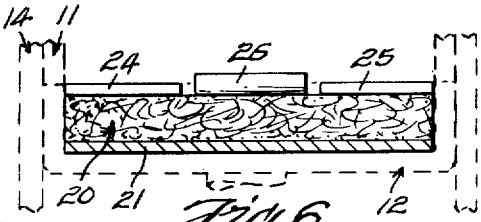
Fig. 6 is a sectional view taken on line 6—6 of Fig. 5.
Figure 8:
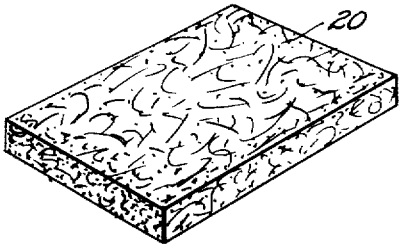
Fig. 8 is a perspective view of the one piece absorbent ink containing pad.
Figure 7:
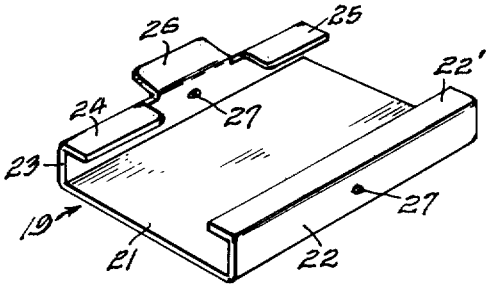
Fig. 7 is a perspective view of the holder in an inverted position.

In the drawings, wherein for the purpose of illustration only, is shown a preferred embodiment of my invention, the numeral 10 designates, generally, one type of stamping machine. This type of machine is customarily used in stores for marking merchandise with the purchase price thereof.

The machine designated 10, as illustrated, embodies a base frame structure 11 having a partially open bottom side and an inverted receptacle, or pocket designated 12 located at the upper end of the base frame structure 11. The machine is also provided with a spring loaded handle 13 and a connected yoke 14 which is movable up and down for actuating, or turning upside down a carrier for a plurality of rotatably supported bands 15, 16, 17 and 18, herein known as character containing bands. Other types of stamping machines may be provided with my improved inking pad *holder*. The inking pad, generally, includes a holder designated, generally, as 19, and an absorbent ink containing pad 20, rectangular in shape and preferably formed as a single piece of suitable felt cut to fit the holder and positioned therein and removable therefrom from [either] *an open* end only of the holder.

The holder 19 includes and embodies an open ended channel shaped body, or member having a horizontal plate-like top wall 21 having a vertical flange, leg or side wall 22 along one longitudinal edge of the wall 21 and which terminates in an inwardly projecting flange lying in spaced parallel relation with the wall 21. The wall 21 also has a second vertical flange, leg or side wall 23 along the opposite longitudinal edge thereof which terminates in two spaced apart inwardly projecting flanges 24 and 25 lying in spaced parallel relation with the horizontal wall 21. The reference character 26 designates an intermediate outwardly projecting finger gripping flange which is a termination of the side wall 23.

The reference numeral 27 designates two outwardly projecting protuberances on the vertical flanges, legs, or side walls *22 and* 23 of the open ended channel shaped retainer which are adapted to be frictionally received in corresponding recesses 28 formed in opposed inner walls of the retainer receiving receptacle, or pocket 12 at the upper end of the base frame structure 11 of the stamping machine so as to guard against downward displacement of the ink pad receiving holder 19.

From the foregoing description, it will be recognized that I have provided a very simple and inexpensive structure to be used as an inking pad *holder* for stamping mechanisms, which will overcome certain objections to, and defects in the present types of inking [pads] *pad holders* for stamping machines, and in which gluing of an absorbent ink containing pad to a retainer is entirely eliminated because the retainer is so flanged that the absorbent pad which, in its entirety, is but a single piece of suitable ink absorbing felt, is placed in the holder by moving it thereinto from [either] *the open* end of the retainer and removed therefrom from [either] *the open* end of the holder.

The many advantages of the herein described invention will readily suggest themselves to those skilled in the art to which it appertains.

What I claim is:

1. In an inking pad [holder] for self-inking hand stamping machines, a U-shaped member having [open ends] *at least one open end,* the opposed wall portions of the member terminating in *substantially* flat [horizontal] inwardly projecting flanges, one of the flanges having a section thereof projecting *laterally* outwardly [and lying in a plane with the other flanges] to serve as a *substantially* flat [horizontally disposed] finger grip to manipulate the [holder] *member,* and a felt pad inserted into and removable from the [holder] *member* from [either of the open ends] *the open end* thereof.

2. In a [holder] *member* as defined in claim 1, including an outwardly projecting detent on the opposed walls of the [holder] *member* and midway the ends thereof.

3. An inking pad *holder* for self-inking hand stamping machines having, in combination, a U-shaped holder with the opposed walls thereof provided with inwardly directed flanges [lying in a plane with each other] and with one of the walls having a *substantially* flat [horizontally disposed] *laterally* outwardly projecting finger gripping flange type handle intermediate the ends of the holder [and lying in a plane with the inwardly directed flanges, and], said holder having [open ends] *at least one open end* to facilitate inserting a felt inking pad into the holder and for removing the inking pad therefrom.

References Cited in the file of this patent or the original patent

UNITED STATES PATENTS

| | | |
|---|---|---|
| 351,928 | Laughton | Nov. 2, 1886 |
| 1,230,783 | Rice | June 19, 1917 |
| 1,401,436 | Pannier | Dec. 27, 1921 |
| 1,987,802 | Ryan | Jan. 15, 1935 |